July 5, 1932. P. J. DAX 1,865,680
PROCESS OF MALTING RICE
Filed Sept. 20, 1929

INVENTOR
PETER J. DAX
BY *Fetherstonhaugh & Co*
ATTORNEYS

Patented July 5, 1932

1,865,680

UNITED STATES PATENT OFFICE

PETER J. DAX, OF MONTREAL, QUEBEC, CANADA, ASSIGNOR TO CANADA MALTING COMPANY, LIMITED, OF MONTREAL, CANADA

PROCESS OF MALTING RICE

Application filed September 20, 1929. Serial No. 394,106.

This invention relates to new and useful improvements in the process of malting rice and the main object of the invention is to provide a simple process of malting rice in such a manner that the grain remains fresh and pure throughout the period of growing.

Another object is to provide a rice malting process which allows free liberation of the gases formed during germination.

According to my invention, I take rice from which the paddy has been removed without injury to the germ. This rise is called shelled or brown rice. This shelled or brown rice is then placed in a suitable drum, the sides of which are perforated. The whole drum is rotatably mounted in a tank filled with water the temperature and flow of which is regulated or controlled. The drum is rotated within the tank at desirable periods to release the gases formed during germination and particularly to prevent the packing of the rice within the drum. This tumbling of the rice while submerged in water does not injure the acrospire, germ or rice as the water acts as a cushion and only allows for a gentle settling of the rice after agitation. When germination is completed, the rice is dried and then screened to remove the sprouts. After this treatment the rice is placed in storage bins or bags and is ready for marketing.

Referring to the accompanying drawing.

Figure 1:
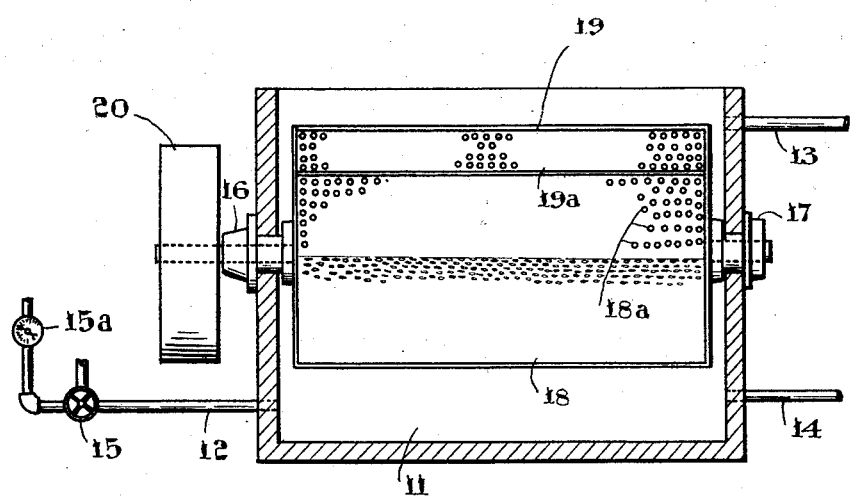
Figure 1 is a view, partly in side elevation and partly in vertical section of one form of apparatus that may be employed in carrying out my process.
Figure 2:
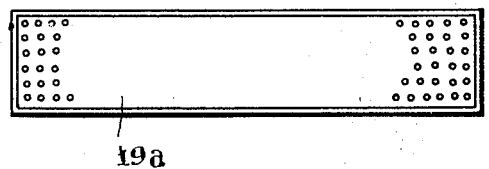
Figure 2 is a plan view of a cover for the drum shown in Figure 1.

Referring more particularly to the drawing 11 designates a tank having an inlet 12, an overflow 13, and an outlet pipe 14. Water is fed into the tank and a valve 15 is provided in the feed pipe to regulate the flow therethrough. The pipe may also be provided with a suitable temperature gauge 15a to register the temperature of the water being fed into the tank. Mounted in suitable bearings 16 and 17 at the ends of the tank is a drum 18 provided with perforations 18a. This drum which is of cylindrical form is within the tank and an opening 19 is formed in the wall thereof to allow for the placing of the grain therein. This opening is closed by a perforated cover 19a (Fig. 2) which may be secured in place in any suitable manner. The tank is filled with water and the drum slowly rotated by means of the pulley 20 which is connected by a belt to any suitable driving element. Prior to being placed in the drum 18, the grain is shelled in such a manner as to leave the germ intact and uninjured. The combined flow of water and agitation of the grain while under water allows the gases produced through germination to escape so that there is no trapped gases which would otherwise tend to rot or affect the grain. The combined agitation and flow of water prevents matting and packing of the grain. The rice thus treated retains its natural sweetness throughout the period of growing or germination. When germination is completed, the rice is dried and then screened to remove the sprouts. Subsequent to this treatment, the rice is ready for bagging and storing.

The product so prepared comes under the definition of malt and can be used by the brewer as a barley malt adjunct or a barley malt substitute without further treatment.

Having thus described my invention, what I claim is:

A method of malting rice which consists in placing brown rice in a perforated container, submerging the container in a flowing stream of water, periodically rotating the submerged container so that the rice is subjected to a comparatively gentle tumbling operation to release the gases formed during germination and to prevent matting or packing of the rice in the container and drying and screening the rice when germination is completed.

In witness whereof, I have hereunto set my hand.

PETER J. DAX.